(12) United States Patent
Nohr et al.

(10) Patent No.: US 6,551,701 B1
(45) Date of Patent: Apr. 22, 2003

(54) COATING COMPOSITION CONTAINING BEADS OF HIGH REFRACTIVE INDEX

(75) Inventors: Ronald S. Nohr, Alpharetta, GA (US); John G. MacDonald, Decatur, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/600,569

(22) PCT Filed: Jan. 20, 1999

(86) PCT No.: PCT/US99/01226

§ 371 (c)(1),
(2), (4) Date: Sep. 25, 2000

(87) PCT Pub. No.: WO99/36269

PCT Pub. Date: Jul. 22, 1999

Related U.S. Application Data

(60) Provisional application No. 60/071,944, filed on Jan. 20, 1998.

(51) Int. Cl.$^7$ .................................................. B32B 5/16
(52) U.S. Cl. ................. 428/323; 106/656; 106/712; 106/804; 106/816; 106/144.1; 106/287.18; 106/287.19; 428/327; 428/328; 428/330; 428/341; 428/342

(58) Field of Search .................................. 428/323, 327, 428/328, 341, 342, 330; 106/656, 712, 804, 816, 144.1, 257.18, 287.19

(56) References Cited

U.S. PATENT DOCUMENTS

| | | | | |
|---|---|---|---|---|
| 4,678,695 A | * | 7/1987 | Tung et al. | |
| 5,340,854 A | * | 8/1994 | Martic et al. | 430/536 |
| 5,851,742 A | * | 12/1998 | Nishio | 430/465 |
| 6,238,804 B1 | * | 5/2001 | Atherton et al. | 428/532 |
| 6,323,989 B1 | * | 11/2001 | Jacobson et al. | 359/296 |
| 6,342,305 B1 | * | 1/2002 | MacDonald et al. | |

* cited by examiner

Primary Examiner—H. Thi Le
(74) Attorney, Agent, or Firm—Kilpatrick Stockton LLP

(57) ABSTRACT

The present invention is directed to a coating composition for print media. The present invention is further directed to improved printed substrates having the coating composition thereon and methods of making the improved print substrates. The improved print substrates substantially enhance the brightness and brilliance of colorants applied to the coating composition, especially compared to colorants applied to conventional coated or uncoated print media.

41 Claims, No Drawings

COATING COMPOSITION CONTAINING BEADS OF HIGH REFRACTIVE INDEX

This application claims benefit of Ser. No. 60/071,944 filed Jan. 20, 1998.

TECHNICAL FIELD

The present invention is directed to a coating composition for print media. The present invention is further directed to improved print substrates having the coating composition thereon and methods of making the improved print substrates. The improved print substrates substantially enhance the brightness and brilliance of colorants applied to the coating composition, especially compared to colorants applied to conventional coated or uncoated print media.

BACKGROUND OF THE INVENTION

The influence of a substrate on colorant brightness and brilliance can be extremely important. Conventional print substrates typically contain filler materials and/or surface coatings in order to improve the brightness and brilliance of colorants applied thereto. Although many attempts have been made to enhance the brightness and brilliance of colorants, the attempts have resulted in less than acceptable color quality.

There exists a need for methods and compositions, which are capable of enhancing the brightness and brilliance of a wide variety of colorants, especially magenta colorants. There also exists a need for improved substrates, which are providing superior, color quality by enhancing the brightness and brilliance of colorants applied thereto.

SUMMARY OF THE INVENTION

The present invention addresses the needs described above by providing a coating composition and an improved print substrate coated with the composition. The coating composition contains unique microspheres having a refractive index of from about 1.9 to about 2.4. Colorants applied to the improved print substrate exhibit exceptional brightness and brilliance compared to conventional print substrates. In addition, the present invention provides a coating that is elastic and does not cause the substrate to curl when heat is applied.

The present invention is also directed to methods of making the composition and improved substrates described above. Superior color quality, print vibrancy, and colorant brilliance is achieved by combining the aforementioned improved substrates and any colorant composition, particularly ink jet inks.

These and other features and advantages of the present invention will become apparent after a review of the following detailed description of the disclosed embodiments.

DETAILED DESCRIPTION OF THE INVENTION

The present invention is directed to a coating composition for print media. The present invention is also directed to improved print substrates comprising a base layer and the above coating composition on at least one surface of the base layer. The improved substrates substantially enhance the brightness and brilliant of colorants applied to the coating composition on the substrate, especially compared to colorants applied to conventional coated or uncoated print media. The present invention is further directed to improved print substrates having the above coating composition thereon and methods of making the improved print substrates.

The coating composition of the present invention comprises microspheres, or beads, having a refractive index of from about 1.9 to about 2.4. The beads are available from The Photographic Institute, Beijing, China, and comprise significant amounts (greater than about 1.0 weight percent) of titanium, barium, calcium and oxygen; minor amounts (less than about 1.0 weight percent) of aluminum, iron, strontium, zinc, and zirconium; and possibly minute amounts of sodium, tellurium, and other elements. An electron microprobe analysis of a bead sample reveals the following bead composition as shown in Table 1 below.

TABLE 1

| Aluminum | 442 | ppm |
| --- | --- | --- |
| Boron | <25 | ppm |
| Barium | major | ppm |
| Beryllium | <25 | ppm |
| Calcium | major | ppm |
| Cadmium | <25 | ppm |
| Cobalt | <25 | ppm |
| Chromium | <25 | ppm |
| Copper | <25 | ppm |
| Iron | 124 | ppm |
| Gallium | <25 | ppm |
| Magnesium | <25 | ppm |
| Manganese | <25 | ppm |
| Molybdenum | <25 | ppm |
| Nickel | <25 | ppm |
| Oxygen | major | ppm |
| Phosphorus | <25 | ppm |
| Lead | <25 | ppm |
| Tin | <25 | ppm |
| Strontium | 2878 | ppm |
| Titanium | major | ppm |
| Vanadium | <25 | ppm |
| Zinc | 3523 | ppm |
| Zirconium | 9641 | ppm |

The commercially available beads are desirably substantially spherical and have particle diameters ranging from about 2 microns to about 45 microns, although having a variety of sizes is not critical to the present invention. As used herein, the phrase "substantially spherical" is intended to encompass beads having a perfectly spherical shape, as well as, beads having an imperfect spherical shape, such as wherein the bead length may be slightly larger or smaller than the bead breath. In one embodiment of the present invention, the commercially available beads are mechanically separated into samples having relatively narrow particle diameter ranges. For example, one sample comprises beads having a particle diameter range of about 27 to about 45 microns. Another sample comprises beads having a particle diameter range of about 2 to about 43 microns. Coating compositions of the present invention may be prepared using commercially available beads or select beads having a desired particle size or particle size range.

Image analysis of two bead samples is given below. All units are in microns.

SAMPLE 1

| Measurement | Average | Minimum | Maximum | 1 Std Deviation |
| --- | --- | --- | --- | --- |
| Longest Dimension | 12.68 | 4.22 | 43.07 | 8.18 |
| Breath | 11.24 | 2.74 | 41.52 | 7.98 |
| Area Equiv. Diameter | 11.69 | 3.58 | 42.18 | 8.03 |

SAMPLE 2

| Measurement | Average | Minimum | Maximum | 1 Std Deviation |
|---|---|---|---|---|
| Longest Dimension | 39.80 | 30.45 | 44.87 | 2.82 |
| Breath | 38.17 | 27.83 | 43.35 | 2.92 |
| Area Equiv. Diameter | 38.53 | 28.58 | 43.75 | 2.85 |

As shown by the above data, Sample 1 has a broad particle size distribution from about 1 to about 45 microns, while Sample 2 has a much narrower particle size distribution from about 25 to about 45 microns. In both samples, the equivalent circular diameter (area equivalent diameter) is very close to the particle length and breath, indicating that the beads are almost perfectly spherical particles.

The coating composition of the present invention optionally further contains one or more polymeric binders. Suitable binder materials include, but are not limited to, naturally-occurring polymers, synthetically-modified naturally-occurring polymers or synthetic polymers as exemplified in *Water-Soluble Polymers,* C. L. McCormick, J. Bock, and D. N. Schulz, in Vol. 17, *Encyclopedia of Polymer Science and Engineering,* John Wiley and Sons, Publishers (1989), pgs. 730–84. Desirably, the binder comprises one or more of the following polymers: polyvinylpyrrolidone (PVP), polyvinylalcohol (PVOH), polyhydroxyethyl acrylate, polyhydroxyethyl methacrylate, polyacrylamide, polymethacrylamide, polyethylene glycol, carboxymethyl cellulose, sodium carboxymethyl cellulose, hydroxypropyl cellulose, hydroxyethyl cellulose, polyacrylic acid and polyacrylic acid salts, polymethacrylic acid and polymethacrylic acid salts, polyvinylsulfonate and polyvinylsulfonate salts, poly-2-acrylamido-2-methylpropanesulfonic acid and poly-2-acrylamido-2-methylpropanesulfonic acid salts, polyacryloxytrimethylammonium chloride, polymethacryloxytrimethylammonium chloride, and polydiallyldimethylammonium chloride. Desirably, the binder comprises sodium carboxymethyl cellulose, polyvinylpyrrolidone (PVP), polyvinylalcohol (PVOH) or a combination thereof. More desirably, the binder comprises polyvinylalcohol (PVOH).

The coating composition may optionally contain one or more cyclodextrins. Suitable cyclodextrins include, but are not limited to, α-cyclodextrin, β-cyclodextrin, γ-cyclodextrin, δ-cyclodextrin, hydroxypropyl β-cyclodextrin, hydroxyethyl β-cyclodextrin, hydroxyethyl α cyclodextrin, carboxymethyl α cyclodextrin, carboxymethyl β cyclodextrin, carboxymethyl γ cyclodextrin, octyl succinated α cyclodextrin, octyl succinated β cyclodextrin, octyl succinated γ cyclodextrin and sulfated β cyclodextrin and sulfated γ-cyclodextrin (Cerestar USA Incorporated, Hammond, Ind.). Desirably, the cyclodextrin comprises β-cyclodextrin (β-CD), γ-cyclodextrin (γ-CD), hydroxyethyl β-cyclodextrin (he-β-CD), hydroxypropyl β-cyclodextrin (hp-β-CD), or a combination thereof. More desirably, the cyclodextrin comprises hydroxyethyl β-cyclodextrin (he-β-CD).

In the present invention, the coating composition may contain from about 1 to about 30 parts by weight (pbw) beads, from about 10 to about 50 pbw polymeric binder, optionally from about 0 to about 300 pbw cyclodextrin and from about 100 to about 500 pbw water. In some embodiments, the coating composition contains from about 5 to about 10 parts by weight (pbw) beads, from about 10 to about 20 pbw polymeric binder, optionally from about 100 to about 200 pbw cyclodextrin and from about 100 to about 300 pbw water. The coating composition may contain more beads; however, significant colorant brightness and brilliance results from as little as 1 pbw beads.

In addition to the beads, polymeric binder and cyclodextrin, the coating composition of the present invention may also contain additional components. Examples of such additional components include, but are not limited to, charge carriers; stabilizers against thermal oxidation; viscoelastic properties modifiers; cross-linking agents; plasticizers; charge control additives such as a quaternary ammonium salt; flow control additives such as hydrophobic silica, zinc stearate, calcium stearate, lithium stearate, polyvinylstearate, and polyethylene powders; fillers such as calcium carbonate, clay and talc; surfactants; detackifiers; chelating agents; and TINUVIN® compounds; among other additives used by those having ordinary skill in the art. Charge carriers are well known to those having ordinary skill in the art and typically are polymer-coated metal particles. Desirable surfactants include, but are not limited to, $C_{12}$ to $C_{18}$ surfactants such as cetyl trimethyl ammonium chloride and carboxymethylamylose, and other surfactants such as Triton X-100 and SURFYNOL® 420. TINUVIN® compounds are a class of compounds produced by Ciba-Geigy Corporation, which includes benzophenones, benzotriazoles and hindered amines. Desirable TINUVIN® compounds include, but are not limited to, 2-(2'-hydroxy-3'-sec-butyl-5'-tert-butylphenyl)-benzo-triazole, poly-(N-β-hydroxyethyl-2,2,6,6-tetramethyl-4-hydroxy-piperidyl succinate and 2-(2'-hydroxy-3',5'-ditertbutylphenyl)-5-chloro-benzotriazole. The identities and amounts of such additional components in the colored composition are well known to one of ordinary skill in the art. Typically, one or more of the above additives are present in the coating composition in an amount of from about 1 to 14 weight percent based on the total weight of the coating composition.

The coating composition may be applied to a variety of substrates to form improved print substrates of the present invention. Suitable substrates to which the coating composition may be applied include, but are not limited to, paper, wood, a wood product or composite, woven fabric, nonwoven fabric, textile, plastic, glass, metal, foil or any other substrate that would benefit from having a coating composition thereon. Plastic substrates include, but are not limited to, a plastic film, a plastic nonwoven web, or a plastic woven web. A preferred substrate is paper. Any existing or future type of paper or paper products may be used in the present invention.

Examples of paper or paper products include, but not limited to, printing and writing papers, packaging and industrial papers, paperboard, and tissue papers. Examples of printing and writing papers include, but are not limited to the following: wood-free coated papers; wood-containing coated papers; wood-free uncoated papers such as bond and writing paper, envelopes, offset and opaque circular, carbonless, tablet, forms bond, ledger, mimeograph, and manifold, duplication, fax base, thermal base, technical papers, supercalandered, and specialty papers; uncoated wood-containing papers such as supercalandered, directory, specialty converting and publishing; bristols such as coated bristols, uncoated bleached bristols, tag, coated tag papers, file folders, and tabulating; and thin papers such as cigarette paper, bible paper, lightweight paper, lightweight specialty, manifold, cotton fiber papers, and specialty thin papers.

Examples of packaging and industrial papers include, but are not limited to the following: breached Kraft paper such as grocers bags, shipping sacks, wrapping paper, and converting paper; unbleached Kraft paper such as grocers bags, shipping sacks converting paper, wrapping paper, and envelopes. Examples of paperboard include, but are not limited to the following: containerboard such as unbleached linerboard, bleached linerboard, corrugated medium, and chip and filler board; folding boxboard/folding cartonboard such as solid bleached sulfite, bleached and unbleached bristols, coated recycled board, coated unbleached Kraft, milk, cup, plate and foodservice stock (coated or uncoated), and folding board; gypsum wallboard; and tube/can and drum paperboard. Examples of tissue papers include, but are not limited to, sanitary tissues such as bathroom tissue, facial tissue, napkins, toweling, wiper stock, and other sanitary tissue papers.

The base layer of the improved print substrate may comprise one or more of the above-mentioned layers. Desirably, the base layer is a coated or uncoated fiber-containing substrate such as Photoglossy Base, Presentation Matte Photobase, and High Quality Matte papers and Wet-strength Media; a film such as White Opaque Films (e.g. KIMDURA®, K-C), Clears Films (e.g. MELINEX®, ICI) Backlit Films, and Vinyl; or a nonwoven such as TYVEK®. More desirably, the base layer is a coated or uncoated paper. Most desirably, the base layer is a coated paper comprising a cellulose sheet coated with a polymeric film, such as polyethylene.

The coating composition is coated onto the base layer by any conventional coating method including, but not limited to, rod coating, dip coating, spray coating, gravure coating, knife coating, slot coating, and roller coating. Desirably, the coating composition is applied to the base layer by a process wherein the coating composition is transferred from a bath onto a roller which extends into the bath, and onto at least one surface of the base layer. Optionally, the same or a different coating may be provided on the same or an opposite side of the base layer. The coated base layer then passes under or over a rod, which meters excess coating from the base layer. Once coated, the base layer is dried in a conventional oven or by any other means known to those of ordinary skill in the art.

The amount of coating composition applied to a surface of the base layer may vary depending upon the type of base layer used and the application of the final product. For example, a base layer in the form of an uncoated paper may require more coating composition than a base layer in the form of a coated paper or film due to the increased porosity of the base layer. Desirably, the coating composition is applied to a base layer to produce a coating weight of from about 3.0 to about 60.0 g/m$^2$ of base layer surface area. In some embodiments, the coating weight is from about 9.0 to about 23.0 g/m$^2$ of base layer surface area. In other embodiments, the coating weight is from about 15.0 to about 20.0 g/m$^2$ of base layer surface area.

The thickness of the coating composition may also vary depending upon the type of base layer used and the application of the final product. Desirably, the coating composition has a thickness of about 0.1 to about 5.0 mil. In some embodiments, the coating composition has a thickness of about 0.5 to about 2.0 mil. In other embodiments, the coating composition has a thickness of about 1.0 to about 1.5 mil.

The present invention is further described by the examples which follow. Such examples, however, are not to be construed as limiting in any way either the spirit or scope of the present invention. In the examples, all parts are parts by weight unless stated otherwise.

EXAMPLE 1

Preparation of Bead/PVOH Composition

A coating composition was formulated by mixing 0.1 g of beads having a composition as shown in Table 1 above and 1.0 g of a 10% solution of polyvinylalcohol (PVOH) (AIRVOL® 523, Air Products). After stirring for 5 minutes on a hot plate, the solution converted to an elastic rubber-like material. The material was capable of being stretched approximately 3 feet without breaking. The elastic material was coated onto a sheet of paper and air dried.

Magenta ink was applied to the coated sheet. Magenta ink was also applied to a second uncoated sheet or paper. The magenta ink on the coated paper was noticeably brighter than the magenta ink on the uncoated paper.

COMPARATIVE EXAMPLE 2

Preparation of TiO$_2$/PVOH Composition

For comparison to the coating composition of Example 1, a coating composition was formulated by mixing 0.1 g of TiO$_2$ powder (TITANDIOXID P25, DEGUSSA) and 1.0 g of a 10% solution of polyvinylalcohol (PVOH) (AIRVOL® 523, Air Products). After stirring for 5 minutes on a hot plate, the solution thickened but did not result in an elastic rubber-like material.

EXAMPLE 3

Preparation of Bead/PVOH/Cyclodextrin Composition

A coating composition was formulated by mixing 0.1 g of beads, 1.0 g of a 10% solution of polyvinylalcohol (AIRVOL® 523, Air Products), 1.0 g of γ-cyclodextrin, γ-CD, (Cerestar) and 1.0 g of water. The components were stirred in a beaker at room temperature for five minutes, forming an elastic rubber-like material. A sample of the elastic material was applied with a No. 40 rod onto a sheet of glossy paper and dried to form a highly reflective coating having a textured surface.

EXAMPLE 4

Preparation of Bead/PVOH Composition

A coating composition was formulated by mixing 0.5 g of beads, 3.0 g of a 10% solution of polyvinylalcohol (AIRVOL® 523, Air Products) and 1.0 g of water. The components were stirred in a beaker at room temperature for five minutes, forming an elastic rubber-like material. A sample of the elastic material was stored at room temperature for approximately 5 minutes, forming a clear rubber material.

EXAMPLE 5

Preparation of Bead/PVOH/Cyclodextrin Composition

A coating composition was formulated by mixing 0.3 g of beads, 1.0 g of a 10% solution of polyvinylalcohol (AIRVOL® 523, Air Products), 1.0 g of γ-cyclodextrin, γ-CD, (Cerestar) and 1.0 g of water. The components were stirred in a beaker at room temperature for five minutes, forming an elastic rubber-like material. A sample of the elastic material was stored at room temperature for approximately 10 minutes, forming a latex rubber material.

EXAMPLE 6

Preparation of Bead/PVOH/Cyclodextrin Composition

A coating composition was formulated by mixing 0.11 g of beads, 1.0 g of a 10% solution of polyvinylalcohol (AIRVOL® 523, Air Products), 1.0 g of hydroxyethyl β-cyclodextrin, he-β-CD, (Cerestar) and 1.0 g of water. The PVOH, he-β-CD and water were stirred in a beaker at room temperature for five minutes. The beads were added to the mixture, which was stirred for three minutes and heated on a hot plate for five minutes. Upon cooling, the mixture formed a very elastic rubber-like material. A sample of the elastic material was applied with a No. 7 rod onto a sheet of glossy paper and dried to form a highly reflective coating having a smooth surface.

EXAMPLE 7

Preparation of Bead/PVOH/Cyclodextrin Composition

A coating composition was formulated by mixing 0.05 g of beads, 1.0 g of a 10% solution of polyvinylalcohol (AIRVOL® 523, Air Products), 2.0 g of hydroxyethyl β-cyclodextrin, he-β-CD, (Cerestar) and 1.0 g of water. The PVOH, he-β-CD and water were stirred in a beaker at room temperature for five minutes. The beads were slowly added to the mixture, which was stirred for three minutes and heated on a hot plate for five minutes. Upon cooling, the mixture thickened, but did not form an elastic rubber-like material having remarkable stretch, most likely due to the higher concentration of cyclodextrin.

EXAMPLE 8

Preparation of Bead/PVOH/Cyclodextrin Composition

A coating composition was formulated by mixing 0.05 g of beads, 1.0 g of a 10% solution of polyvinylalcohol (AIRVOL® 523, Air Products), 3.0 g of hydroxyethyl β-cyclodextrin, he-β-CD, (Cerestar) and 1.0 g of water. The PVOH, he-β-CD and water were stirred in a beaker at room temperature for five minutes. The beads were slowly added to the mixture, which was stirred for three minutes and heated on a hot plate for five minutes. Upon cooling, the mixture thickened and had less stretch than in Example 7.

Having thus described the invention, numerous changes and modifications thereof will be readily apparent to those having ordinary skill in the art, without departing from the spirit or scope of the invention.

What is claimed is:

1. A coating composition comprising microspheres having a refractive index of about 1.9 to about 2.4, and one or more cyclodextrins.

2. The coating composition of claim 1, wherein the microspheres comprise titanium, barium, calcium and oxygen.

3. The coating composition of claim 2, wherein the microspheres further comprise aluminum, iron, strontium, zinc, and zirconium.

4. The coating composition of claim 3, wherein the microspheres have the following composition:

| | | |
|---|---|---|
| Aluminum | 442 | ppm |
| Boron | <25 | ppm |
| Barium | >10,000 | ppm |
| Beryllium | <25 | ppm |
| Calcium | >10,000 | ppm |
| Cadmium | <25 | ppm |
| Cobalt | <25 | ppm |
| Chromium | <25 | ppm |
| Copper | <25 | ppm |
| Iron | 124 | ppm |
| Gallium | <25 | ppm |
| Magnesium | <25 | ppm |
| Manganese | <25 | ppm |
| Molybdenum | <25 | ppm |
| Nickel | <25 | ppm |
| Oxygen | >10,000 | ppm |
| Phosphorus | <25 | ppm |
| Lead | <25 | ppm |
| Tin | <25 | ppm |
| Strontium | 2878 | ppm |
| Titanium | >10,000 | ppm |
| Vanadium | <25 | ppm |
| Zinc | 3523 | ppm |
| Zirconium | 9641 | ppm |

5. The coating composition of claim 1, wherein the microspheres are substantially spherical and have particle diameters ranging from about 2 microns to about 45 microns.

6. The coating composition of claim 5, wherein the microspheres have particle diameters ranging from about 27 to 45 microns.

7. The coating composition of claim 5, wherein the microspheres have particle diameters ranging from about 2 to 43 microns.

8. The coating composition of claim 1, further comprising one or more polymeric binders.

9. The coating composition of claim 8, wherein the one or more polymeric binders comprise polyvinylpyrrolidone (PVP), polyvinylalcohol (PVOH), polyhydroxyethyl acrylate, polyhydroxyethyl methacrylate, polyacrylamide, polymethacrylamide, polyethylene glycol, carboxymethyl cellulose, sodium carboxymethyl cellulose, hydroxypropyl cellulose, hydroxyethyl cellulose, polyacrylic acid, polyacrylic acid salts, polymethacrylic acid, polymethacrylic acid salts, polyvinylsulfonate, polyvinylsulfonate salts, poly-2-acrylamido-2-methylpropanesulfonic acid, poly-2-acrylamido-2-methylpropanesulfonic acid salts, polyacryloxytrimethylammonium chloride, polymethacryloxytrimethylammonium chloride, polydiallyldimethylammonium chloride, or combinations thereof.

10. The coating composition of claim 8, wherein the one or more polymeric binders comprise sodium carboxymethyl cellulose, polyvinylpyrrolidone (PVP), polyvinylalcohol (PVOH) or a combination thereof.

11. The coating composition of claim 1, wherein the one or more cyclodextrins comprise α-cyclodextrin, β-cyclodextrin, γ-cyclodextrin, δ-cyclodextrin, hydroxypropyl β-cyclodextrin, hydroxyethyl β-cyclodextrin, hydroxyethyl α cyclodextrin, carboxymethyl α cyclodextrin, carboxymethyl β cyclodextrin, carboxymethyl γ cyclodextrin, octyl succinated α cyclodextrin, octyl succinated β cyclodextrin, octyl succinated γ cyclodextrin, sulfated β cyclodextrin, sulfated γ-cyclodextrin, or combinations thereof.

12. The coating composition of claim 11, wherein the one or more cyclodextrins comprise β-cyclodextrin, γ-cyclodextrin, hydroxyethyl β-cyclodextrin, hydroxypropyl β-cyclodextrin, or a combination thereof.

13. The coating composition of claim 1, wherein the composition comprises from about 1 to about 30 parts by weight (pbw) of the microspheres, from about 10 to about 50 pbw of one or more polymeric binders, up to about 300 pbw of one or more cyclodextrins, and from about 100 to about 500 pbw water.

14. The coating composition of claim 13, wherein the composition comprises from about 5 to about 10 parts by weight (pbw) of the microspheres, from about 10 to about 20 pbw of one or more polymeric binders, from about 100 to about 200 pbw of one or more cyclodextrins, and from about 100 to about 300 pbw water.

15. A substrate coated with the coating composition of claim 1.

16. The substrate of claim 15, wherein the substrate comprises paper, wood, woven fabric, nonwoven fabric, textile, plastic, glass, metal, foil, or a combination thereof.

17. The substrate of claim 16, wherein the substrate comprises paper.

18. The substrate of claim 15, wherein the coating composition is applied to the substrate to produce a coating weight of from about 3.0 to about 60.0 g/m².

19. The substrate of claim 18, wherein the coating composition is applied to the substrate to produce a coating weight of from about 9.0 to about 23.0 g/m².

20. The substrate of claim 18, wherein the coating composition is applied to the substrate to produce a coating weight of from about 15.0 to about 20.0 g/m².

21. An article comprising:
   a substrate; and
   a coating composition on a surface of the substrate; wherein the coating composition comprises microspheres having a refractive index of about 1.9 to about 2.4, and one or more cyclodextrins.

22. The article of claim 21, wherein the substrate comprises paper, wood, woven fabric, nonwoven fabric, textile, plastic, glass, metal, foil, or a combination thereof.

23. The article of claim 22, wherein the substrate comprises paper.

24. The article of claim 21, wherein the coating composition is applied to the substrate to produce a coating weight of from about 3.0 to about 60.0 g/m².

25. The article of claim 24, wherein the coating composition is applied to the substrate to produce a coating weight of from about 9.0 to about 23.0 g/m².

26. The article of claim 25, wherein the coating composition is applied to the substrate to produce a coating weight of from about 15.0 to about 20.0 g/m².

27. The article of claim 21, wherein the microspheres comprise titanium, barium, calcium and oxygen.

28. The article of claim 27, wherein the microspheres further comprise aluminum, iron, strontium, zinc, and zirconium.

29. The article of claim 28, wherein the microspheres have the following composition:

| | | |
|---|---|---|
| Aluminum | 442 | ppm |
| Boron | <25 | ppm |
| Barium | >10,000 | ppm |
| Beryllium | <25 | ppm |
| Calcium | >10,000 | ppm |
| Cadmium | <25 | ppm |
| Cobalt | <25 | ppm |
| Chromium | <25 | ppm |
| Copper | <25 | ppm |
| Iron | 124 | ppm |
| Gallium | <25 | ppm |
| Magnesium | <25 | ppm |
| Manganese | <25 | ppm |
| Molybdenum | <25 | ppm |
| Nickel | <25 | ppm |
| Oxygen | >10,000 | ppm |
| Phosphorus | <25 | ppm |
| Lead | <25 | ppm |
| Tin | <25 | ppm |
| Strontium | 2878 | ppm |
| Titanium | >10,000 | ppm |
| Vanadium | <25 | ppm |
| Zinc | 3523 | ppm |
| Zirconium | 9641 | ppm |

30. The article of claim 21, wherein the microspheres are substantially spherical and have particle diameters ranging from about 2 microns to about 45 microns.

31. The article of claim 30, wherein the microspheres have particle diameters ranging from about 2 to 45 microns.

32. The article of claim 30, wherein the microspheres have particle diameters ranging from about 2 to 43 microns.

33. The article of claim 1, wherein the coating composition further comprises one or more polymeric binders.

34. The article of claim 33, wherein the one or more polymeric binders comprise polyvinylpyrrolidone (PVP), polyvinylalcohol (PVOH), polyhydroxyethyl acrylate, polyhydroxyethyl methacrylate, polyacrylamide, polymethacrylamide, polyethylene glycol, carboxymethyl cellulose, sodium carboxymethyl cellulose, hydroxypropyl cellulose, hydroxyethyl cellulose, polyacrylic acid, polyacrylic acid salts, polymethacrylic acid, polymethacrylic acid salts, polyvinylsulfonate, polyvinylsulfonate salts, poly-2-acrylamido-2-methylpropanesulfonic acid, poly-2-acrylamido-2-methylpropanesulfonic acid salts, polyacryloxytrimethylammonium chloride, polymethacryloxytrimethylammonium chloride, polydiallyldimethylammonium chloride, or combinations thereof.

35. The article of claim 34, wherein the one or more polymeric binders comprise sodium carboxymethyl cellulose, polyvinylpyrrolidone (PVP), polyvinylalcohol (PVOH) or a combination thereof.

36. The article of claim 21, wherein the one or more cyclodextrins comprise α-cyclodextrin, β-cyclodextrin, γ-cyclodextrin, δ-cyclodextrin, hydroxypropyl β-cyclodextrin, hydroxyethyl β-cyclodextrin, hydroxyethyl α cyclodextrin, carboxymethyl α cyclodextrin, carboxymethyl β cyclodextrin, carboxymethyl γ cyclodextrin, octyl succinated α cyclodextrin, octyl succinated β cyclodextrin, octyl succinated γ cyclodextrin, sulfated β cyclodextrin, sulfated γ-cyclodextrin, or combinations thereof.

37. The article of claim 36, wherein the one or more cyclodextrins comprise β-cyclodextrin, γ-cyclodextrin, hydroxyethyl β-cyclodextrin, hydroxypropyl β-cyclodextrin, or a combination thereof.

38. The article of claim 21, wherein the coating composition comprises from about 1 to about 30 parts by weight (pbw) of the microspheres, from about 10 to about 50 pbw of one or more polymeric binders, up to about 300 pbw of one or more cyclodextrins, and from about 100 to about 500 pbw water.

39. The article of claim 38, wherein the coating composition comprises from about 5 to about 10 parts by weight (pbw) of the microspheres, from about 10 to about 20 pbw of one or more polymeric binders, from about 100 to about 200 pbw of one or more cyclodextrins, and from about 100 to about 300 pbw water.

40. A method of enhancing the brightness and brilliance of a colorant, said method comprising:
   applying the colorant onto the coating composition of claim 1.

41. A method of enhancing the brightness and brilliance of a colorant, said method comprising:
   applying the colorant onto the coating composition of the article of claim 21.

* * * * *